Nov. 10, 1959 R. N. RHODES 2,912,489
COLOR TELEVISION, BURST SEPARATION SYSTEM
Filed Oct. 11, 1955 2 Sheets-Sheet 1
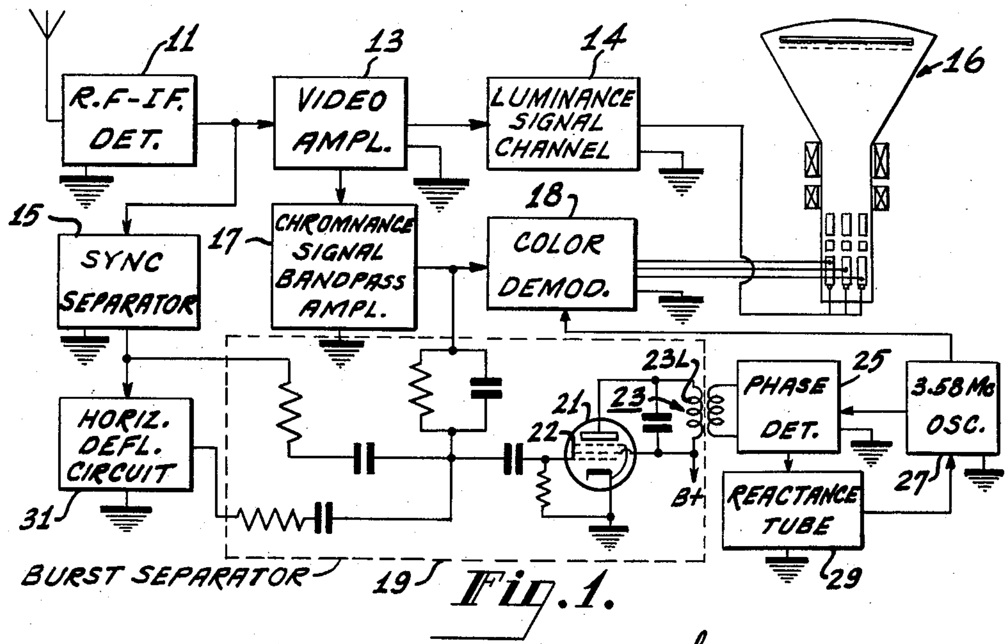
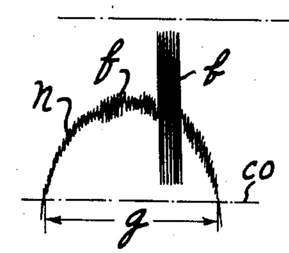
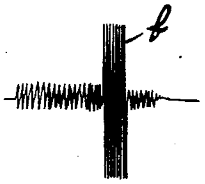
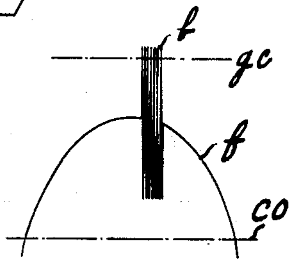
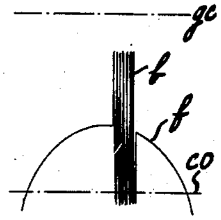
Fig. 2a. Fig. 2b. Fig. 2c. Fig. 2d.
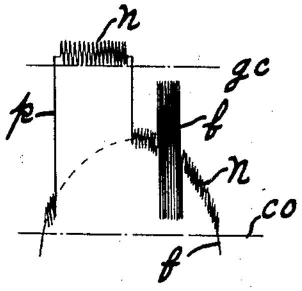
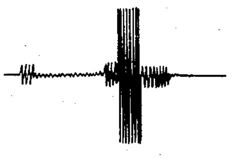
Fig. 3a Fig. 3b.
INVENTOR.
Roland N. Rhodes
BY [signature]
ATTORNEY Nov. 10, 1959 R. N. RHODES 2,912,489

COLOR TELEVISION, BURST SEPARATION SYSTEM

Filed Oct. 11, 1955 2 Sheets-Sheet 2

INVENTOR.
Roland N. Rhodes
BY
[signature]
ATTORNEY

United States Patent Office 2,912,489

Patented Nov. 10, 1959

2,912,489

COLOR TELEVISION, BURST SEPARATION SYSTEM

Roland N. Rhodes, Levittown, Pa., assignor to Radio Corporation of America, a corporation of Delaware Application October 11, 1955, Serial No. 539,843

1 Claim. (Cl. 178—5.4)

Figure 4:
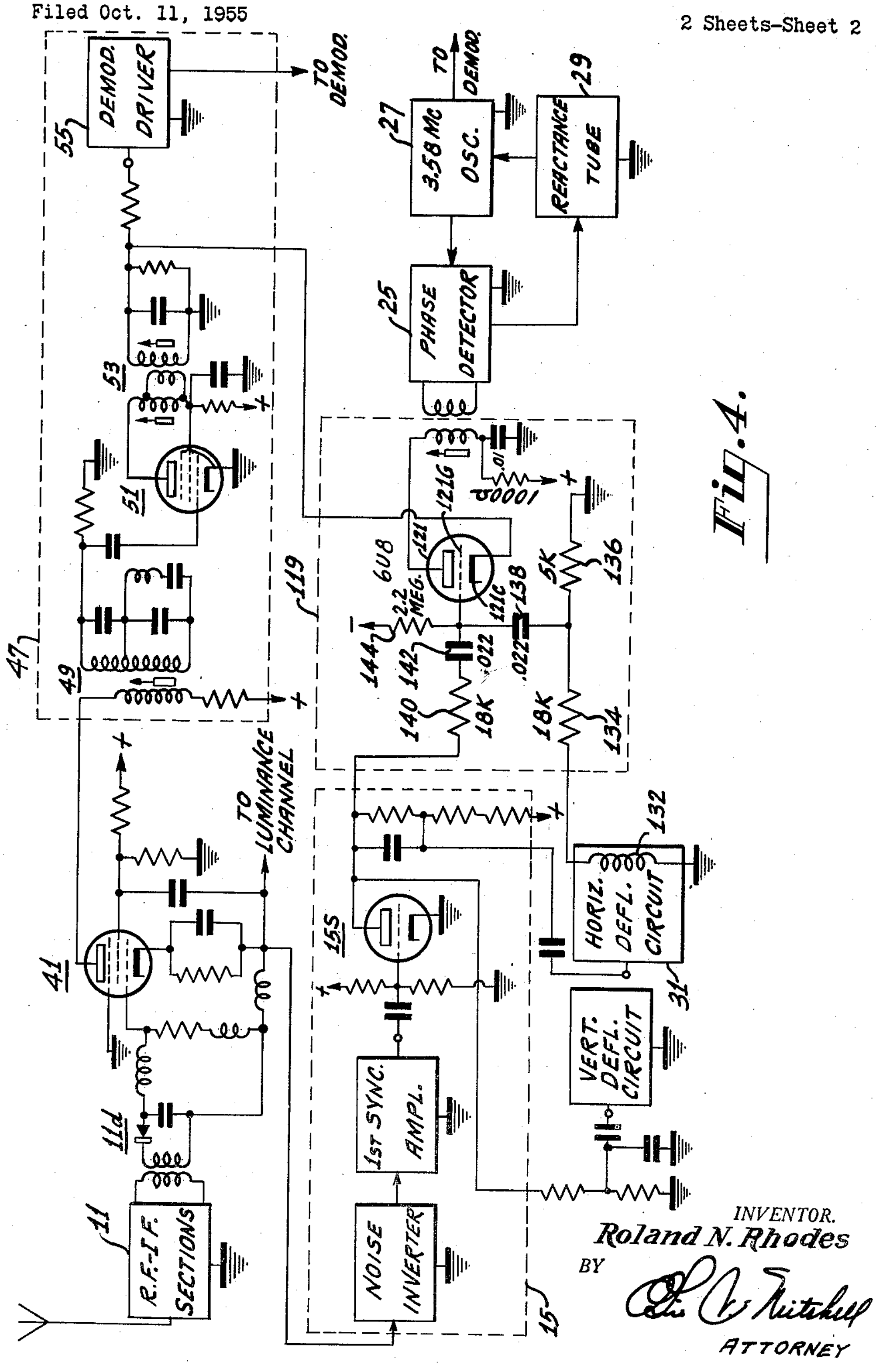

The present invention relates generally to color television receivers, and in particular to an improved system for separating the color synchronizing burst from a received composite color picture signal in such receivers.

It has heretofore been customary to effect burst separation in a color receiver by applying the output of the receiver's chrominance bandpass amplifier to a tube which is gated into conduction by a kick-back pulse derived from the receiver's horizontal deflection system. It has been found desirable to provide some means for fixing the D.-C. level at the input of the gated burst separator tube to insure proper amplification of the applied burst despite changes in the amplitude of the gating pulse (which may occur due to load variations on the receiver's high voltage supply). Thus, it has been proposed that a diode level setter be employed in the gating pulse input circuit to fix the D.-C. level so that positive peaks of the burst do not draw grid current and negative peaks of burst do not go beyond cut-off. The present invention is directed toward an arrangement for accomplishing these purposes without the necessity of providing the additional diode and with the advantage of providing improved noise immunity.

In accordance with an embodiment of the present invention, separated horizontal synchronizing pulses are applied to the control grid of the burst separator tube in addition to the gating flyback pulses, the sync pulses being of sufficient amplitude to draw grid current and thus effect the desired level setting. By driving the control grid to grid current during the portion of the gating interval immediately preceding the burst, noise components occurring on the chrominance signal during this pre-burst period are substantially suppressed by the grid current and a significant improvement of the signal-to-noise ratio of the separated burst is thereby achieved.

Accordingly, a primary object of the present invention is to provide a color television receiver with an improved arrangement for separating the color synchronizing burst from the received composite color picture signal.

An additional object of the present invention is to provide a novel and improved burst gating circuit wherein adequate burst amplification without distortion is substantially assured.

A further object of the present invention is to provide a novel burst separator circuit with substantially improved noise immunity.

Other objects and advantages of the present invention will occur to those skilled in the art after a reading of the following detailed description and an inspection of the accompanying drawings in which:

Figure 1 illustrates in block and schematic form a portion of a color television receiver including a burst separator embodying the principles of the present invention.

Figures 2*a*, 2*b*, 2*c*, 2*d*, 3*a* and 3*b* illustrate graphically signal waveforms which aid in an explanation of the operation and advantages of embodiments of the present invention.

Figure 4 illustrates in block and schematic form a portion of a color television receiver involving a modification of the embodiment of the present invention illustrated in Figure 1.

In Figure 1 a portion of a conventional television receiver is illustrated in simplified block form. The receiver includes the usual RF, IF and video detector sections, represented by the block designated 11. The composite video signal output of the video detector is applied to a video amplifier 13, as well as to suitable circuits 15 for separating the deflection synchronizing pulses from the applied composite video signal. An output of video amplifier 13 is applied via a suitable luminance signal channel 14 to the "red," "green" and "blue" cathodes, in common, of a color kinescope 16; an output of video amplifier 13 is also applied to a bandpass amplifier 17, which is provided with a passband appropriate to passage of the color subcarrier and its sidebands that comprise the chrominance signal portion of the composite video signal. The output of bandpass amplifier 17 is applied to the receiver's color demodulators 18 for recovery of respective color-difference signals to be applied to the appropriate control grids of the color kinescope 16.

The output of the bandpass amplifier 17 is also applied to a burst separator 19, embodying the principles of the present invention. The burst separator 19 includes an amplifier tube 21, illustratively shown as a pentode, the plate circuit of the tube 21 comprising a parallel resonant circuit 23 tuned to the color subcarrier frequency. The inductance element 23L of the resonant circuit 23 serves as the primary of a transformer which couples the separated burst output of tube 21 to a phase detector 25, which develops a control voltage for automatic frequency control of the receiver's 3.58 mc. oscillator 27. The frequency control of oscillator 27 is effected in the usual manner by a reactance tube circuit 29, responsive to the control voltage output of the phase detector 25.

The burst separator 19 operates on familiar gated amplifier principles, a flyback pulse derived from the horizontal output transformer (not specifically illustrated) of the horizontal deflection circuits 31 being applied to the signal input circuit of the amplifier tube 21, that is, the control grid 22 of the tube 21 in addition to the chrominance signal output of bandpass amplifier 17. The circuit parameters are adjusted such that the tube 21 is gated into conduction only during the recurring peaks of the flyback pulse waveform derived from deflection circuits 31.

In accordance with the principles of the present invention, however, an additional pulse waveform is also applied to the control grid 22 of tube 21. This additional pulse waveform comprises a train of separated sync pulses (of positive polarity) derived from the output of the sync separator circuits 15. To appreciate the advantages obtained by the additional application of separated sync pulses to the gated amplifier control grid 22, reference may now be made to the waveforms illustrated in Figures 2*a*, 2*b*, 2*c* and 2*d*, and in Figures 3*a* and 3*b*. Figure 2*a* illustrates the appearance of the composite waveform at control grid 22 in the absence of application of the separated sync pulses thereto. The subcarrier burst "*b*" is shown superimposed upon the flyback pulse "*f*." In addition, noise components "*n*," of a frequency in the region of the subcarrier frequency, are assumed to be present in the output of the chrominance signal bandpass amplifier, and are shown as superimposed upon the composite flyback pulse-burst waveform. The axis labeled "*co*" in Figure 2*a* represents cut-off potential. It will be observed that the delayed time location of the burst relative to the peak of the gating flyback pulses requires an effective gate width "*g*" which is substantially longer than the duration of the burst. It will also be observed that the noise components occurring in the output of bandpass amplifier 17 throughout this relatively wide interval therefore appear in the output of the gated tube 21, as illustrated by the output waveform of Figure 2*b*.

Figures 2*c* and 2*d* illustrate the effect on the input waveform to the gated tube 21 of variations in the amplitude of the gating flyback pulse in the absence of level setting means. It will be seen in Figure 2*c* that an increase in flyback pulse amplitude may result in the positive peaks of the burst driving tube 21 into grid current. Figure 2*d* shows that a decrease in flyback pulse amplitude may result in the negative peaks of the burst driving the tube 21 beyond cut-off.

Since it is normally desired that amplification of the burst in the separating operation be as high as possible, reduction of the burst input amplitude to avoid such burst distortions is not a satisfactory solution. Use of a diode level setter in the burst separator input circuit is one possible solution, whereby maximum burst amplification in the separating operation may be achieved without danger of burst distortion despite flyback pulse amplitude variations.

The present invention, however, provides a more economical manner of effecting such level setting, with the added advantage of eliminating to a substantial extent the noise components which might otherwise pass to the output of the burst separator during the pre-burst portion of the burst gating interval. Figure 3*a* illustrates the composite waveform appearing at control grid 22 when separated sync pulses of positive polarity are applied thereto in accordance with the embodiment of the invention illustrated in Figure 1. As shown in Figure 3*a*, each positive sync pulse "*p*" occurring during the pre-burst portion of the gating interval, is of sufficient amplitude (suitably greater than the amplitude of the burst's positive peaks) that its peak regularly drives tube 21 to grid current, effectively setting the D.-C. level of the composite waveform such that undistorted amplification of the burst is assured. As shown by the output waveform of Figure 3*b*, a result of the flow of grid current during the pre-burst application of the positive sync pulse is a "smearing" and substantial elimination of the coincidentally occurring noise components "*n*" accompanying the burst in the output of the bandpass amplifier 17.

Figure 4 illustrates application of the principles of the present invention to modification of a color television receiver of the RCA 21-CT-661U type. Detailed information concerning this type of receiver may be readily obtained from the RCA Victor Service Data Pamphlet designated 1955 No. T5. While only some of the receiver sections have been illustrated in Figure 4, and and many of these only in simplified block form, certain sections such as the second detector, first video amplifier, chroma bandpass amplifier and second sync amplifier have been illustrated in schematic detail for ease in understanding of the details of the necessary modification. Where feasible, the same reference numerals have been used to designate corresponding elements in Figures 1 and 4.

In Figure 4, it will be noted that composite video signals are derived from both plate and cathode of the first video amplifier 41. The signals derived from the cathode are applied to the luminance signal channel which feeds the luminance signal in common to the respective "red," "blue" and "green" cathodes of the electron gun structure of the receiver's color kinescope. The signals appearing at the plate of amplifier 41 are applied to the chrominance signal channel 47, which includes, in cascade, a color take-off transformer 49, a bandpass amplifier 51, a bandpass transformer 53 and a demodulator driver 55. The demodulator driver 55 supplies the chrominance signal output of the chrominance signal channel

47 to the receiver's "$R-Y$" and "$G-Y$" demodulators, the outputs of which are fed to respectively appropriate control grids of the electron gun structure of the color kinescope, and are also suitably combined in a matrix to form a "$B-Y$" signal, which is separately amplified for application to the remaining color kinescope control grid.

The 3.58 mc. oscillations required for operation of the demodulators are obtained from the oscillator 27. Frequency control of oscillator 27 is effected by the reactance tube circuit 29 responsive to the error voltage output of phase detector 25, which compares the output of oscillator 27 with the color synchronizing bursts of subcarrier frequency passed to it by the burst separator 119.

The burst separator 119, embodying the principles of the present invention, corresponds generally in principle of operation to the burst separator 19 of Figure 1, but differs in circuit details to be noted. It will be observed that the burst separator tube 121 takes the form of a triode, with the output of bandpass amplifier 51 applied to the cathode 121C thereof. Flyback pulses, derived from a horizontal output transformer secondary winding 132, are applied via a resistive dividing network 134—136 and a coupling capacitor 138 to the control grid 121G of the separator tube 121. Also applied to the control grid 121G, via resistor 140 and capacitor 142, are separated and amplified sync pulses of positive polarity derived from the plate of the second sync amplifier 15S in the receiver's sync signal channel 15. A resistor 144 connects the control grid 121G to a suitable source of negative bias potential.

Although, in the embodiment of Figure 4, the output of bandpass amplifier 51 is applied to a different beam control electrode (i.e. cathode 121C) than that to which the flyback and sync pulses are applied, it will be readily appreciated that the principles of operation and the resultant advantages are generally the same for this embodiment as for the embodiment of Figure 1, as previously explained with the aid of the waveforms of Figures 2 and 3, since the cathode 121C is a part of the input circuit to the tube 121. Comparison of the circuits of Figure 4 with the schematic diagrams illustrated in the aforementioned service data pamphlet will illustrate the simplicity with which a conventional color television receiver may be modified to enjoy the advantages of the present invention. It will also be appreciated that, while Figures 1 and 4 have illustrated two specific forms of apparatus for practicing the present invention, a number of other circuit modifications are feasible in providing such apparatus.

Having thus described the invention, what is claimed is:

In a color television receiver provided with a source of composite signals including recurring color synchronization bursts of oscillations, a source of horizontal flyback pulses, and a source of deflection synchronizing pulses, burst separating apparatus comprising an electron discharge device having a signal input circuit, means for applying said composite signals from said first-named source to the signal input circuit of said electron discharge device, means for applying flyback pulses from said second-named source to said input circuit for selectively gating said electron discharge device into conduction, and means for applying synchronizing pulses from said third-named source to said input circuit to control the D.-C. level of said gating flyback pulses.

References Cited in the file of this patent

UNITED STATES PATENTS

| | | |
|---|---|---|
| 2,594,380 | Barton | Apr. 29, 1952 |
| 2,653,187 | Luck | Sept. 22, 1953 |